United States Patent [19]

Nielsen

[11] Patent Number: 5,129,089
[45] Date of Patent: Jul. 7, 1992

[54] DISTRIBUTED INTERLOCK APPARATUS AND DISTRIBUTED INTERLOCK MANAGEMENT METHOD

[75] Inventor: Michael J. K. Nielsen, Palo Alto, Calif.

[73] Assignee: Digital Equipment Corporation, Maynard, Mass.

[21] Appl. No.: 771,784

[22] Filed: Oct. 3, 1991

Related U.S. Application Data

[63] Continuation-in-part of Ser. No. 134,771, Dec. 18, 1987, abandoned.

[51] Int. Cl.⁵ ..................... G06F 13/14; G06F 12/00
[52] U.S. Cl. ................... 395/725; 364/DIG. 1; 364/DIG. 2; 364/228; 364/229; 364/229.2; 364/230; 364/242.6; 364/931.4; 364/935.41
[58] Field of Search ............ 395/DIG. 1, DIG. 2, 395/200, 250, 275, 600, 650, 725

[56] References Cited

U.S. PATENT DOCUMENTS

| | | | |
|---|---|---|---|
| 4,214,304 | 7/1980 | Shimizu et al. | 364/200 |
| 4,480,304 | 10/1984 | Carr et al. | 364/200 |
| 4,574,350 | 3/1986 | Starr | 364/200 |
| 4,937,733 | 6/1990 | Gillett, Jr. et al. | 364/200 |

FOREIGN PATENT DOCUMENTS 58-214957 6/1982 Japan.

OTHER PUBLICATIONS

Sahni, "Crosspoint Cache Architectures", Proceedings of the 1987 International Conference on Parallel Processing (Aug. 1987) pp. 268-269.
Ghosal et al., "Shamp: An Experimental Shared Memory Multimicroprocessor System and Performance Evaluation of Parallel Algorithms", Microprocessing and Microprogramming 19 (1987), pp. 179-192.
Mühlemann, "Method for Reducing Memory Conflicts Caused by Busy Waiting in Multiple-Processor Synchronisation", IEE Proc., vol. 127, pt. E, No. 3 (May 1980), pp. 85-87.

Primary Examiner—Thomas C. Lee
Assistant Examiner—Robert B. Harrell
Attorney, Agent, or Firm—Flehr, Hohbach, Test, Albritton & Herbert

[57] ABSTRACT

Interlocking of addresses in a system with parallel processors using a common memory space is managed by maintaining for each processor a record of the lock state of the system. When a processor seeks to initiate a transaction, the transaction is analyzed against the lock state record, and the processor's request for access to an intercommunication bus is transmitted only when the lock state of the system is in condition to process the transaction. By monitoring and analyzing bus transactions, the lock state record of each processor is maintained up to date. By thus blocking a transaction involving a locked address before the bus is requested, the tying up of the bus in futile activity is avoided.

13 Claims, 2 Drawing Sheets

5,129,089

DISTRIBUTED INTERLOCK APPARATUS AND DISTRIBUTED INTERLOCK MANAGEMENT METHOD

This is a continuation of application Ser. No. 07/134,771 filed Dec. 18, 1987, now abandoned.

BRIEF SUMMARY OF THE INVENTION

This invention relates to management of interlocking in computer systems with parallel processors using a common memory space.

Certain computer systems are designed to have several processors which process instructions quasi-independently in parallel but use a common memory space. An intercommunication bus provides a facility for transfer of information, packages as transactions, between processors and between any processor and a common memory. In order to assure that the bus is used by the several processors in an orderly way, some means is provided for controlling access to the bus, receiving requests for and granting use of the bus. A need for interlocking arises in such systems to forestall the use of data from some interrelated group of addresses (giving for example, the coordinates of a point) by one processor while this data is in the midst of being updated by another processor.

The present invention manages interlocking of addresss in a system with parallel processors using a common memory space by maintaining for each processor a record of the lock state of the system. When a processor seeks to initiate a transaction, the transaction is analyzed against the lock state record, and the processor's request for access to the bus is transmitted only when the lock state of the system is in condition to process the transaction. By monitoring and analyzing bus transactions, the lock state record is maintained up to date. By thus blocking a transaction involving a locked address before the bus is requested, the typing up of the bus to futile activity is avoided.

DETAILED DESCRIPTION

Figure 1:
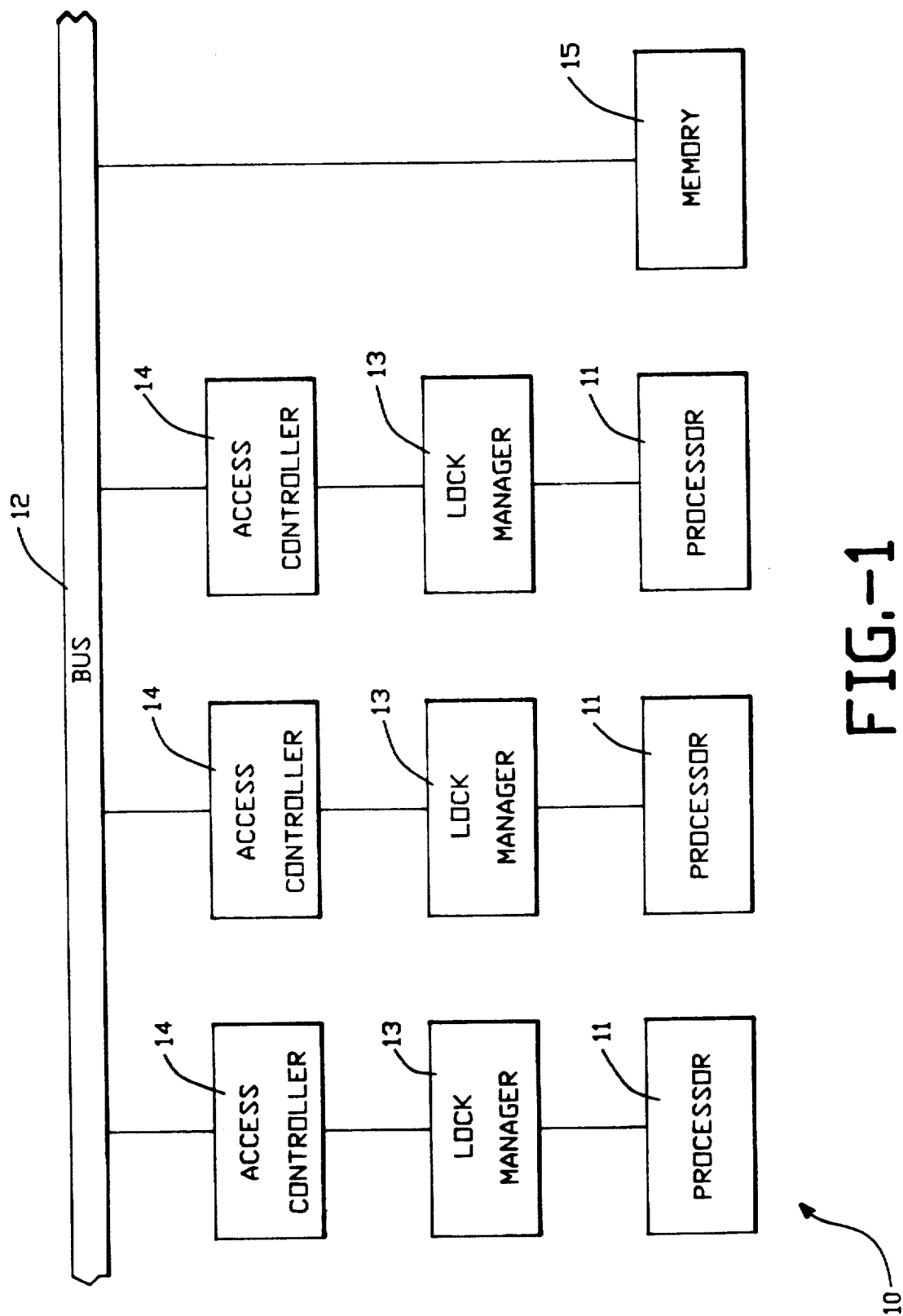
FIG. 1 shows in block diagram for a computer system with parallel processors managing interlocking according to the invention.

Referring to the Figures, computer system 10 includes as components processors 11 each connected to intercommunication bus 12 through interlock managing circuitry 13 and access controllers 14, which may be as described in copending application Ser. No. 123,958. Access controllers 14 in the aggregate control access of the processors to the bus. Memory store 15 is also connected to bus 12 and stores memory space used jointly by all the processors.

Figure 2:
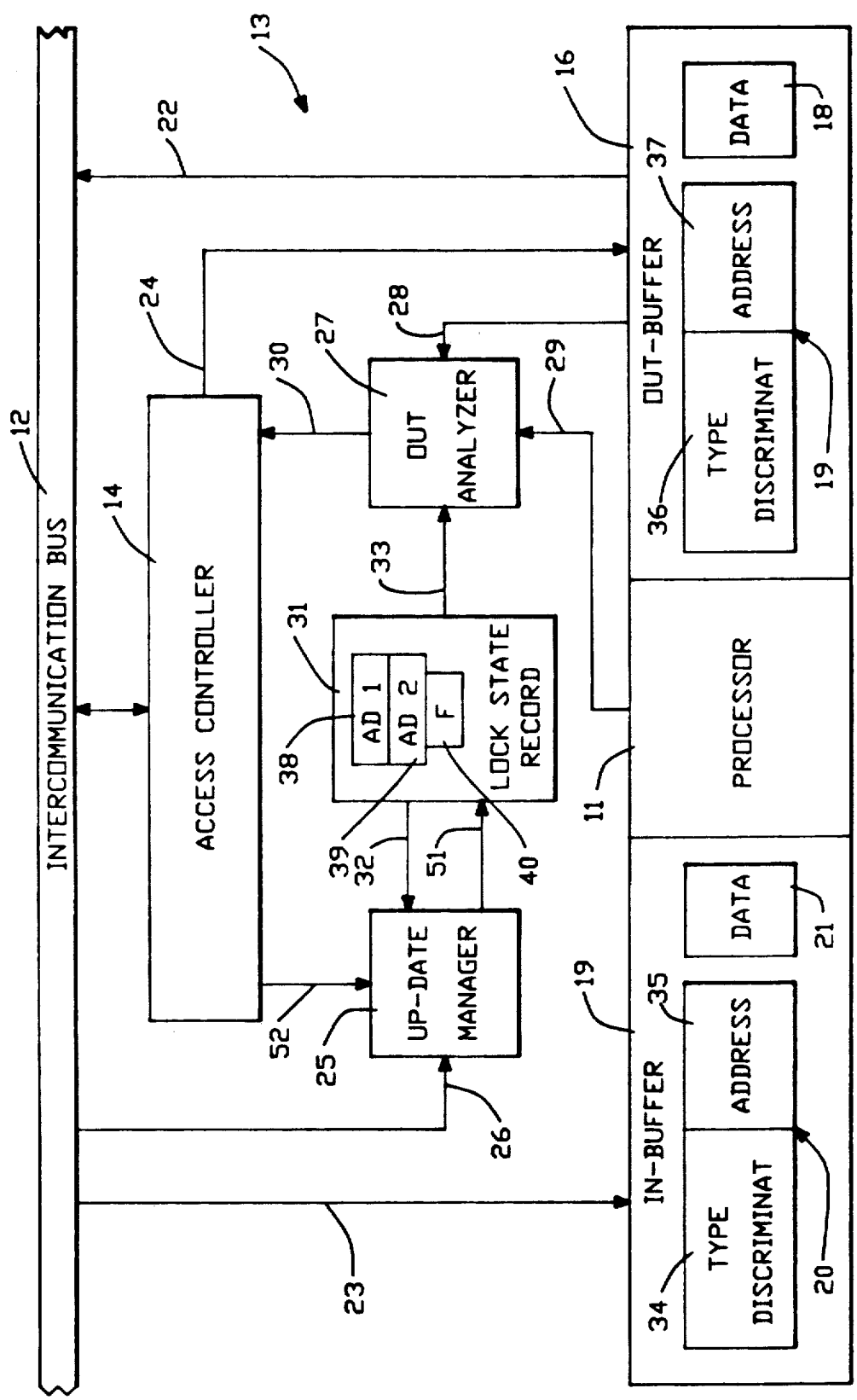
FIG. 2 shows in greater detail elements associated with an individual processor of FIG. 1.

As shown more particularly in FIG. 2, each processor 11 has an associated out-buffer 16 having a transaction characterization store 17 and a data store 18. Characterization store 17 includes type discriminant store 36 and address store 37. Each processor 11 also has an associated in-buffer 19 with a data store 21 and characterization store 20. Characterization store 20 includes type discriminant store 34 and address store 35. Out-buffer 16 is connected to bus 12 through channel 22 and to access controller 14 through channel 24; in-buffer 19 is connected to bus 12 through channel 23. Up-date manager 25 is connected to intercommunication bus 12 through channel 26 and to access controller 14 through channel 52. Out-analyzer 27 is connected to out-buffer 16 through channel 28, to processor 11 through channel 29 and to access controller 14 through channel 30. Up-date manager 25 and out-analyzer 27 include conventional circuitry which will be further discussed in connection with the operations of the system. Lock state record 31 is connected to up-date manager 25 through channels 32 and 51, and to out-analyzer 27 through channel 33. Lock state record 31 has a capacity for storing two addresses and includes first locked address store 38, second locked address store 39, and F-discriminant store 40. F-discriminant store holds signals indicating whether the address stores hold valid addresses. When an address store holds a valid address it will be interpreted as full, and when all the locked address stores hold valid addresses the lock state record will be interpreted as FULL.

Turning now to the operation of the system, when a processor needs to move information to or from the common memory 15 or some other system component, it defines a bus transaction which specifies the activity to take place on the bus to accomplish the desired exchange of information and loads the specification into out-buffer 16 for transmission over the bus. The defined specification include a locking characterization characterizing the effect of the transaction on the lock state of the system. The locking characterization includes a type discriminant which identifies the type of locking operations called for by the transaction and an address in the common memory space which will be effected by the transaction. The types of transaction include type LOCK, indicating that the address of the transaction is to be locked, type UNLOCK, indicating that the address of the transaction is to be unlocked, type NOLOCK, indicating that the address of the transaction admits of being locked but in the transaction is not to be locked, and NONLOCKING, indicating that the address of the transaction is outside the interlocking scheme and does not admit of being locked. Particular system designs may use less than all of these types.

The type discriminant and the transaction address are lodged in the processor's out-buffer in corresponding stores which may b conventional registers. Transmit locking characterization signals indicating the information in the characterization store of the out-buffer are transmitted from out-buffer 16 to out-analyzer 27 on channel 28. After the out-buffer has been thus loaded, the processor sends a ready-to-send signal on channel 29 to out-analyzer 27, indicating that the processor seeks to initiate a transaction on the bus and that it out-buffer is ready to feed the transaction. At this point the out-buffer does nothing further until it received a bus signal from access controller 14 through channel 24.

The out-analyzer 27 receives lock state signals from the lock state record and, as mentioned before, transmits locking characterization signals from the out-buffer and ready to send signals from the processor. It analyzes these input signals using conventional logic circuitry to generate criteria for sending an access request signal on channel 30 to the access controller 14. In particular, when a ready-to-send signal indicates the processor seeks to initiate a transaction and the transmit locking characterization signal indicates the prospective transaction is of type UNLOCK or of type NONLOCKING, the out-analyzer emits an access request signal. When a ready-to-send signal indicates the processor seeks to initiate a transaction, the transmit locking characterization signal indicates the prospective transaction is of type NOLOCK, and the lock state signal indicates that none of the valid locked addresses matches the address of the locking characterization, the out-analyzer emits an access request signal. When a ready-to-send signal indicates the processor seeks to initiate a transaction, the transmit locking characterization signal indicates the prospective transaction if of type LOCK, and the lock state signal indicates that none of the valid locked addresses matches the address of the locking characterization and that the lock state record is NOTFULL, the out-analyzer emits an access request signal. For all conditions other than those enumerated an access request signal is not sent to the access controller, with the result that the request to use the bus for a transaction is deferred until the lock state record is revised to a state compatible with one of the enumerated conditions enabling transmitting the access request signal.

On the incoming side, the type discriminant and address of all transactions passed on the bus 12, whether originating with the local processor or another, are presented to up-date manager 25 through channel 126. When the up-date manager receives a timing signal from the access controller 14 on channel 52 indicating that a valid locking characterization is being presented, it makes a logical analysis of the locking characterization in conjunction with lock state signals from the lock state record and latches the result. Then it effects a revision of the lock state record in accordance with the analysis. More particularly, when the received locking characterization is of type LOCK and address-1 store of the lock state record is NOTFULL, the up-date manager sets the address value of the address-1 store to the address of the locking characterization signal and the F-discriminant of the address-1 store to FULL; when the received locking characterization is of type LOCK and address-1 store of the lock state record is FULL, the up-date manager sets the address value of the address-2 store to the address of the locking characterization signal and the F-discriminant of the address 2 store to FULL. When the received locking characterization is of type UNLOCK and the transaction address matches the address of the address 1 store of the lock state record and the F-discriminant of the address-1 store is FULL, the up-date manager sets the F-discriminant of the address-1 store to NOT FULL; when the received locking characterization is of type UNLOCK and the transaction address matches the address of the address-2 store of the lock state record and the F-discriminant of the F-discriminant of the address-2 store to NOT FULL.

The up-date analyzer uses conventional logic circuitry to effect the state functions for which there is no need of detailed description.

From a global or system point of view, it can be seen that the responsibility for managing the interlocking is distributed among the several processing stations although data is stored in a central memory facility. Each processing station keeps its own record of locked addresses, all the records being identical. Every change in the locked addresses is made through a transaction that propagates over the bus and is available to every processing station irrespective of whether the station is involved in the data movement of the transaction. Each processing station also refers to its lock state record to delay requesting use of the bus when the address it seeks to access is locked. Tis procedure avoids burdening the bus including the bus access control with transactions which would only be rejected if locking were done at the site of the memory.

Another global aspect of the operation of the system is that each processor comply with certain restraints as to the temporal ordering of the transactions which it initiates. In particular, no LOCK type or UNLOCK type transactions must be initiated by a processor except in pairs one of each type and relating to a single address, with the LOCK type preceding the UNLOCK type. This pairing is of course what is usually done with interlocking systems, but it is necessary to preclude exceptions.

The system specifically described above has a capacity to concurrently lock two addresses corresponding to the two-address store of the lock state record. Alternative systems with capacities to handle more locked addresses can readily be implemented by providing the lock state record with more address registers and by straightforwardly augmenting the logic of out-analyzer and the up-date manager to test and manage the additional address stores.

An alternative system with a one-address locking capacity can also be implemented, and for this case some particular economies are possible. For a system with a one-address capacity, the address registers of the lock state store may be eliminated and the F-discriminant reduced to a single bit of storage indicating whether some address is currently locked (i.e., FULL) or not (i.e., NOTFULL). Transactions of the LOCK or NOLOCK types would be deferred while the F-discriminant was FULL. Receipt of a LOCK type transaction would result in setting the F-discriminant to FULL, and receipt of an UNLOCK type transaction i setting the F-discriminant to NOTFULL.

What is claimed is:

1. Distributed interlock apparatus for controlling usage of a plurality of shared resources in a computer system having a multiplicity of subunits, said plurality of shared resources each having an associated unique address, said distributed interlock apparatus comprising:

a communications bus coupled to said multiplicity of subunits and to said plurality of shared resources for transmitting information in transactions therebetween; and a multiplicity of interlock means, each coupled to the communications bus and a corresponding one of said multiplicity of subunits, for determining whether said corresponding one of said multiplicity of subunits can access a specified one of said plurality of shared resources at a specified address; each said interlock means determining only whether said subunit coupled to said interlock means must defer access to specified ones of said plurality of shared resources;

each said interlock means including:

lock record means for monitoring said communications bus, detecting transactions which lock and unlock specified ones of said plurality of shared resources, and storing address values denoting which ones of said plurality of shared resources are locked resources, each locked resource comprising one of said plurality of shared resources which is being used by one of said multiplicity of subunits;

an outer buffer which stores an address value and data value ready to be transmitted by said corresponding one of said subunits via said communications bus; and output processing means, coupled to said output buffer, said communications bus and said lock record means, for comparing said address value stored in said output buffer with said address values stored in said lock record means and for deferring transmission of said values stored in said output buffer via said communications bus when said address value stored in said output buffer corresponds to a locked resource;

wherein each interlock means determines whether a transaction by said subunit coupled to said interlock means would access a locked resource and defers transmission of said transaction on said communications bus as long as the address value associated with said transaction corresponds to a locked resource.

2. The distributed interlock apparatus of claim 1, each said interlock means further including:

update means, coupled to said communications bus and said lock record means, for receiving values transmitted by said communications bus and updating said lock record means in accordance with said received values.

3. The distributed interlock apparatus of claim 1, each said interlock means further including:

access control means, coupled to said output buffer and said output processing means, for controlling access by said subunit coupled to said interlock means to said communications bus and for initiating information transfer transactions via said communications bus.

4. In a computer system having a multiplicity of subunits and a multiplicity of shared resources coupled to a communications bus, a distributed interlock apparatus comprising:

a multiplicity of interlock means, each coupled to the communications bus and to a corresponding one of said multiplicity of subunits, for deferring transactions by said subunit coupled to said interlock means which require access to a specified one of said multiplicity of shared resources which is locked; each said interlock means determining only whether transactions by said subunit coupled to said interlock means must be deferred;

each said interlock means including:

lock status means for monitoring said communications bus, detecting transactions which lock and unlock specified ones of said plurality of shared resources, and storing a multiplicity of status signals denoting which of said multiplicity of shared resources are locked and therefore unavailable for access by the subunit coupled to said interlock means;

access control means, coupled to said communications bus and said lock status means, for deferring transactions by said subunit coupled to said interlock means which require access to a specified one of said multiplicity of shared resources which is denoted by said lock status means as being locked, said transactions being deferred until said specified one of said multiplicity of shared resources is no longer denoted by said lock status means as being locked.

5. The distributed interlock apparatus of claim 4, each said interlock means further including:

update means, coupled to said communications bus and said lock status means, for receiving values transmitted by said communications bus and updating said lock status means in accordance with said received values.

6. Distributed interlock apparatus for controlling usage of a plurality of shared resources in a computer system having a multiplicity of subunits, said plurality of shared resources each having an associated unique address, said distributed interlock apparatus comprising:

a communications bus coupled to said multiplicity of subunits and to said plurality of shared resources for transmitting information in transactions therebetween; and a multiplicity of interlock means, each coupled to the communications bus and a corresponding one of said multiplicity of subunits, for determining whether said subunit coupled to said interlock means can access a specified one of said plurality of shared resources at a specified address; each said interlock means determining only whether said subunit coupled to said interlock means must defer access to specified ones of said plurality of shared resources;

each said interlock means including:

a plurality of lock record means, each lock record means having means for denoting an address corresponding to a locked resource, each locked resource comprising one of said plurality of shared resources which is being used by one of said multiplicity of subunits, and status means for denoting for whether each said lock record means is empty or full;

an output buffer for storing an address value, a data value, and a lock type value ready to be transmitted via said communications bus by said subunit coupled to said interlock means; said lock type value selected from the set consisting of LOCK, UNLOCKED, NOLOCK and NONLOCKING; wherein LOCK denotes that said stored address value corresponds to one of said plurality of shared resources to be locked, UNLOCKED denotes that said stored address value corresponds to one of said plurality of shared resources to be unlocked, NOLOCK denotes that plurality of shared resources but that said corresponding shared resource is not to be locked, and NONLOCKING denotes that said stored address value does not correspond to one of said plurality of shared resources which requires lock protection;

output processing means, coupled to said output buffer, said communications bus and said plurality of lock record means, for comparing said address value stored in said output buffer with said plurality of lock record means and for deferring transmission of said values stored in said output buffer via said communications bus when said stored address corresponds to a locked resource, denoted by an address stored in one of said full lock record means;

update means, coupled to said communications bus and said plurality of lock record means, for monitoring each transaction transmitted via said communications bus, including receiving a lock type value and an address value transmitted by said communications bs and updating said plurality of lock record means in accordance with said received values;

wherein each interlock means determines whether a transaction by said subunit coupled to said interlock means would access a locked resource and prevents transmission of said values stored in said output buffer associated with said transaction on said communications bus as long as the address value associated with said transaction corresponds to a locked resource, thereby avoiding use of said communications bus for attempted transactions with licked resources.

7. The distributed interlock apparatus of claim 6, each said interlock means further including:

access control means, coupled to said output buffer and said output processing means, for controlling to said output buffer and subunit coupled to said interlock means to said communications bus and for initiating information transfer transactions via said communications bus.

8. The distributed interlock apparatus of claim 6, said output processing means further including means for deferring a transaction by said subunit coupled to said interlock means when said lock type value stored in said output buffer is equal to LOCK and said status means indicates that all of said lock record means are full, said transaction being deferred until at least one of said lock record means becomes empty.

9. In a computer system having a multiplicity of subunits and a multiplicity of shared resources interconnected by a communications bus, a interlocking method of controlling access by said multiplicity of subunits to said multiplicity of shared resources, the steps of the method comprising:

coupling to each of said multiplicity of subunits a distinct interlock processor;

each of said interlock processors, substantially simultaneously with each of the other ones of said interlock processors, monitoring said communications bus for transactions which lock and unlock specified ones of said multiplicity of shared resources, and storing a set of lock status signals denoting which of said multiplicity of shared resources are locked and therefore unavailable for access by said subunit; and each of said interlock processors independently deferring transactions which require access to a specified one of said multiplicity of shared resources which is denoted by said stored lock status signals as being locked, said transactions being deferred until said specified one of said multiplicity of shared resources is no longer denoted by said stored lock status signals as being locked;

whereby shared resources interlocking is performed locally at each subunit.

10. The interlocking method of claim 9, said method including the step of:

performing, substantially simultaneously, the following step by each of said interlock processors: receiving values transmitted by said communication bus and updating said stored lock status signals in accordance with said received values.

11. In a computer system having a multiplicity of subunits and a multiplicity of shared resources interconnected by a communications bus, a interlocking method of controlling access by said multiplicity of subunits to said multiplicity of shared resources, the steps of the method comprising:

coupling to each of said multiplicity of subunits a distinct interlock processor;

each of said interlock processors independently and substantially simultaneously performing the following steps:

storing interlock signals comprising address values denoting which ones of said multiplicity of shared resources are locked resources, each locked resource comprising one of said multiplicity of shared resources which is being used by one of said multiplicity of subunits;

storing values associated with a specified transaction, said stored values including an address value and data value ready to be transmitted via said communications bus by the subunit coupled to said interlock processor; and comparing said stored address value which is ready to be transmitted by said subunit coupled to said interlock processor with said stored interlock signals denoting locked resources; and deferring transmission of said stored address and data values when said stored address vale ready to be transmitted corresponds to a locked resource;

whereby shared resource interlocking is performed locally at each subunit.

12. The interlocking method of claim 11, said storing interlock values step including the steps of:

substantially simultaneously each of said interlock processors: receiving values transmitted by said communications bus and updating said stored interlock signals in accordance with said received values.

13. The interlocking method of claim 12, said second storing step including; storing a lock type value ready to be transmitted via said communications bus by said subunit coupled to said interlock processor; said lock type value selected from the set consisting of LOCK, UNLOCKED, NOLOCK and NONLOCKING; wherein LOCK denotes that said stored address value corresponds to one of said multiplicity of shared resources to be locked, UNLOCKED denotes that said stored address value corresponds to one of said multiplicity of shared resources to be unlocked, NOLOCK denotes that said stored address value correspond to one of said multiplicity of shared resources but that said corresponding shared resource is not to be locked by said specified transaction, and NONLOCKING denotes that said stored address value does not correspond to one of said multiplicity of shared resources which requires lock protection;

wherein said updating step includes receiving said lock type value transmitted by said communications bus and updating said stored interlock signals in accordance with said received lock type value.

* * * * *